(12) United States Patent
Porte et al.

(10) Patent No.: US 11,952,136 B2
(45) Date of Patent: Apr. 9, 2024

(54) METHOD FOR MANUFACTURING AN ACOUSTIC PANEL HAVING A CAPSULAR SKIN, AND ACOUSTIC PANEL INCORPORATING SUCH A SKIN

(71) Applicant: Airbus Operations SAS, Toulouse (FR)

(72) Inventors: Alain Porte, Toulouse (FR); Jacques Lalane, Toulouse (FR); Florian Ravise, Toulouse (FR); Franck Dobigeon, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 223 days.

(21) Appl. No.: 17/387,529

(22) Filed: Jul. 28, 2021

(65) Prior Publication Data
US 2022/0097863 A1 Mar. 31, 2022

(30) Foreign Application Priority Data

Jul. 31, 2020 (FR) ...................................... 2008179

(51) Int. Cl.
*B64D 29/00* (2006.01)
*B29D 99/00* (2010.01)
(Continued)

(52) U.S. Cl.
CPC ......... *B64D 29/00* (2013.01); *B29D 99/0021* (2013.01); *F02C 7/045* (2013.01);
(Continued)

(58) Field of Classification Search
CPC .... B64D 29/00; B29D 99/002; G10K 11/162; B29L 2031/3076; B32B 3/12; F02C 7/045; F02C 7/24; F02K 1/827
See application file for complete search history.

(56) References Cited

U.S. PATENT DOCUMENTS 3,831,710 A * 8/1974 Wirt ........................ B32B 27/08
428/116
3,887,031 A * 6/1975 Wirt ..................... G10K 11/172
181/292
(Continued)

FOREIGN PATENT DOCUMENTS

EP 3450738 A1 3/2019
FR 3026122 A1 3/2016
(Continued)

OTHER PUBLICATIONS

English translation of WO-2020174192-A1, accessed May 4, 2023 via USPTO Search Tool (Year: 2020).*
French Search Report; priority document, Apr. 1, 2021.

*Primary Examiner* — Jeremy A Luks
(74) *Attorney, Agent, or Firm* — Greer, Burns & Crain, Ltd.

(57) ABSTRACT

An acoustic panel comprising a cellular structure, such as a honeycomb structure, having cells that open at least onto a first frontal face of the structure. The panel comprises a capsular skin which is fastened to the first frontal face of the cellular structure next to a plurality of cells. The capsular skin including a continuous layer of material, in one piece, forming capsules that extend into the cellular structure. At least one channel is provided at the apex of each capsule for the passage of acoustic waves. Such a panel effectively attenuates the noise of aircraft engines, in particular, the low frequencies. It is extremely easy to manufacture industrially, the capsular skin being able to be obtained by molding with polymerization in situ, the polymerizable material then adhering to the cellular structure while it polymerizes.

12 Claims, 4 Drawing Sheets

(51) Int. Cl.
  *B29L 31/30* (2006.01)
  *F02C 7/045* (2006.01)
  *F02C 7/24* (2006.01)
  *F02K 1/82* (2006.01)
  *G10K 11/162* (2006.01)

(52) U.S. Cl.
  CPC ............... *F02C 7/24* (2013.01); *F02K 1/827* (2013.01); *G10K 11/162* (2013.01); *B29L 2031/3076* (2013.01)

(56) References Cited

U.S. PATENT DOCUMENTS

| | | | |
|---|---|---|---|
| 6,274,216 B1* | 8/2001 | Gonidec | B32B 5/02 |
| | | | 428/116 |
| 9,068,345 B2* | 6/2015 | Ichihashi | F02C 7/045 |
| 9,469,985 B1* | 10/2016 | Ichihashi | G10K 11/172 |
| 9,620,102 B1* | 4/2017 | Ichihashi | F02C 7/045 |
| 9,931,825 B2* | 4/2018 | Gerken | B32B 41/00 |
| 11,261,786 B2* | 3/2022 | Pierick | B32B 7/08 |
| 2004/0163888 A1* | 8/2004 | Johnson | F02K 1/827 |
| | | | 181/294 |
| 2015/0027629 A1 | 1/2015 | Butler et al. | |
| 2018/0230905 A1 | 8/2018 | Riou et al. | |
| 2019/0039745 A1* | 2/2019 | Haile | B64C 1/40 |
| 2019/0063318 A1 | 2/2019 | Roach et al. | |
| 2020/0265821 A1* | 8/2020 | Riccobene | B29C 39/123 |
| 2020/0342843 A1* | 10/2020 | Brossard | F02K 1/827 |
| 2021/0190007 A1* | 6/2021 | Lauder | G10K 11/172 |

FOREIGN PATENT DOCUMENTS

| | | | | |
|---|---|---|---|---|
| FR | 3088658 A1 | 5/2020 | | |
| WO | WO-2020012111 A1 * | 1/2020 | ............ | B29C 70/18 |
| WO | WO-2020174192 A1 * | 9/2020 | ........... | B29D 24/005 |

* cited by examiner

METHOD FOR MANUFACTURING AN ACOUSTIC PANEL HAVING A CAPSULAR SKIN, AND ACOUSTIC PANEL INCORPORATING SUCH A SKIN

CROSS-REFERENCES TO RELATED APPLICATIONS

This application claims the benefit of the French patent application No. 2008179 filed on Jul. 31, 2020, the entire disclosures of which are incorporated herein by way of reference.

FIELD OF THE INVENTION

The present application relates to an acoustic panel and to a method for manufacturing acoustic panels, in particular, acoustic panels for an aircraft nacelle.

BACKGROUND OF THE INVENTION

It will be recalled that an aircraft nacelle is a structure that contains the engine (jet engine, turboshaft engine, turbojet engine, turboprop engine, etc.) and provides the interface between the latter and the airframe of the aircraft. In other words, it allows the engine to be fastened to the airframe of the aircraft via a pylon. Among other functions, the nacelle contributes to the ventilation and thermal regulation of the engine in environments that are very demanding in terms of temperature; it protects the engine by way of its fairing; it channels the primary and secondary air flows of the engine, these being indispensable elements for the optimized generation of thrust; it also makes a considerable contribution to reducing noise emissions by virtue of composite and metal materials that result in sophisticated acoustic treatments.

It will also be recalled that an aircraft nacelle comprises, from the front to the rear, a first portion in the upstream direction of the aerodynamic flow, known as the air intake, a second portion that covers the casing of the engine fan, known as the fan cowl, and a third portion that generally has a thrust reversal zone which surrounds the engine turbine body in the downstream direction of the aerodynamic flow.

The attenuation of noise is obtained, in particular, by the provision of acoustic panels. Such panels can be installed, for example, in a nacelle in the region of the air intake. The air intake delimits a duct through which the air flows towards the motor and, for example, the fan.

The invention applies to the manufacture of acoustic panels of an aircraft nacelle, in particular, to the panels delimiting the internal duct of the air intake of the nacelle.

The known air-intake acoustic panels are generally made up of:
  a perforated resistive skin that is provided in the region of the interior duct of the air intake and forms the visible face thereof; the objective of this resistive skin is to allow the sound waves to pass through and to damp them,
  a rear skin that essentially has the function of ensuring the structural integrity of the panel,
  a cellular damping core, generally of honeycomb structure, on either side of which the resistive skin and the rear skin are fastened, the core being involved in both the mechanical integrity of the panel and acoustic damping, the main function of the core being to trap and damp the sound waves.

The geometry of the core determines the range(s) of sound frequencies that are damped.

It is known practice to insert frustoconical capsules into the cells of the core of acoustic panels. The cells of the damping core are thus divided into two acoustic pockets, making it possible to absorb two frequency ranges, including a low frequency range. The acoustic performance of these panels is, therefore, all the more advantageous since new-generation engines generate increasingly low frequencies, in addition to the current dominant frequencies.

However, the industrial methods proposed thus far for the manufacture of the panels incorporating the capsules remain complex and expensive.

SUMMARY OF THE INVENTION

The invention aims to remedy this drawback by proposing, for the one part, a novel acoustic panel having integrated capsules, the manufacture of which is easier to implement, and, for the other part, a preferential manufacturing method that is simpler, less expensive, quicker and compatible with industrial-scale production.

In this context, the invention proposes an acoustic panel comprising:
  a cellular structure having a first frontal face and a second frontal face, between which there extend cells, the cells opening at least onto the first frontal face of the structure.

The panel according to the invention is characterized in that it comprises a capsular skin which is fastened to the first frontal face of the cellular structure next to a plurality of cells of the cellular structure, the capsular skin comprising a continuous layer of material, in one piece, forming capsules that extend into the cellular structure, at least one channel being provided in the vicinity of an apex of each capsule for the passage of acoustic waves. It should be noted that the expression "in the vicinity of the apex" includes the scenario in which the channel is provided exactly at the apex of the capsule, the "apex" being the peak of the capsule, that is to say, the point furthest away from the first frontal face of the cellular structure. When the capsule comprises a plurality of peaks (at the same distance from the first frontal face), the "apex" is, by convention, the most central point with respect to the walls of the cell.

Such a panel effectively attenuates the noise of aircraft engines, in particular, the low frequencies. As will be seen below, it is also extremely easy to manufacture industrially.

According to one possible feature, the panel according to the invention also comprises a first skin covering the capsular skin at the first frontal face of the cellular structure, and a second skin fastened to the second frontal face of the cellular structure.

According to one possible feature of the invention, the capsular skin extends over the entire frontal surface of the cellular structure and forms a capsule in each of the cells of the structure.

In a variant, the capsular skin extends only over a part of the frontal surface of the cellular structure, next to a zone comprising a plurality of cells (as defined above), and it preferably forms a capsule in each of the cells next to which it extends. According to one possible feature of the invention, the panel may then comprise a plurality of capsular skins that each cover a zone of the cellular structure, each zone covered by a capsular skin comprising, by definition, a plurality of cells.

According to one possible feature of the invention, each capsule of the capsular skin is in the form of a cone frustum of circular section or of a pyramid of polygonal section, for example square, hexagonal or triangular section.

According to one possible feature of the invention, the first skin (that is to say, the one that is fastened on the same side of the cellular structure as the capsular skin) is a perforated or micro-perforated resistive skin and the second skin is an intact structural skin. The reverse is also possible. Thus, in a variant, the first skin is an intact structural skin and the second skin is a perforated or micro-perforated resistive skin.

According to one possible feature of the invention, the cellular structure is a honeycomb structure, the cells of which have a substantially hexagonal section.

According to one possible feature of the invention, the capsular skin is formed of a continuous layer of polymerized polymerizable material, obtained by molding a polymerizable material in a mold comprising a plate and a plurality of raised elements, each of the raised elements having the shape of a capsule, the mold provided with a layer of polymerizable material being arranged on the first frontal face of the cellular structure before the material is polymerized, the polymerization taking place in situ, with the result that the capsular skin adheres directly to the first frontal face of the cellular structure.

As will be seen below, the invention is not, however, limited to this method for manufacturing the capsular skin.

More generally, the invention provides a method for manufacturing an acoustic panel, comprising:
the provision of a cellular structure having a first frontal face and a second frontal face, between which there extend cells, the cells opening at least onto the first frontal face of the structure.

The method according to the invention is characterized in that it comprises the formation of a capsular skin and the fastening of this capsular skin to the first frontal face of the cellular structure next to a plurality of cells, the capsular skin comprising a continuous layer of material, in one piece, forming capsules that extend into the cellular structure, at least one channel being provided in the vicinity of an apex of each capsule for the passage of acoustic waves.

According to one possible feature, the method also comprises the arrangement of a first skin covering the capsular skin at the first frontal face of the cellular structure, and the fastening of a second skin to the second frontal face of the cellular structure.

This method is extremely quick and easy. It consists essentially in forming a capsular skin that is joined (after or at the same time as its formation) to a cellular structure, whereas the previous methods consist in adding independent rigid components in the cells of such a structure, these added components needing to be inserted, to be precisely positioned and then adhesively bonded in each of the cells, using a complex appropriate tool. By virtue of the invention, the industrial tooling is simplified, and the operations of adhesive bonding in each cell are eliminated.

Moreover, the method according to the invention makes it possible to obtain a very thin capsular skin, which is thinner than the wall of the added rigid capsules used in the known techniques, thereby allowing a significant weight saving.

Finally, it is possible to form capsules of any desired shape, or even capsules having a shape that varies from one cell to another, making it possible to alter the ranges of frequencies that are damped.

According to one possible feature of the invention, the capsular skin is obtained by molding a polymerizable material in a mold comprising a plate and a plurality of raised elements, each of the raised elements having the shape of a capsule.

According to a first version using such a mold, the polymerizable material is deposited on the mold and the mold (provided with the still fresh polymerizable material) is arranged on the first frontal face of the cellular structure before the material is polymerized, the polymerization taking place in situ, after assembly. The phase of polymerizing the layer of material that makes up the capsular skin makes it possible, in this case, both to form the capsules and to secure the skin to the cellular structure.

According to a second version of obtaining the capsular skin by molding, the polymerization is effected away from the cellular structure and the capsular skin obtained after polymerization is then adhesively bonded or welded to the first frontal face of the cellular structure, demolding being able to be effected before or after the capsular skin has been adhesively bonded to the first frontal face of the cellular structure. The first version is preferred, however, on account of its ease of implementation.

In these two versions, the polymerizable material is chosen from thermoplastic materials, elastomers, polyurethanes, epoxy resins, which are or are not supported.

The use of these materials has another advantage: the capsular skin obtained remains slightly flexible, this making it subsequently easier to shape the panel. It is easy to provide it with a curve (to give the panel the shape corresponding to its destination), or even a double curve in one or more directions, without any risk of breaking or damaging the cellular structure or the capsular skin or the connection therebetween.

The polymerization of the material may require a step of heating (curing), at a temperature that is sufficiently low for the cellular structure not to be damaged, this temperature being able to be between 120 and 185° C. for the family of epoxy resins and between 330 and 410° C. for the family of thermoplastic resins.

According to one possible feature of the invention, use is made of a mold in which the raised elements have the shape of a cone frustum of circular section or of a pyramid of polygonal section, for example, square, hexagonal or triangular section.

The method according to the invention is not, however, limited to obtaining the capsular skin by molding. In a variant, the capsular skin is obtained by a method chosen from 3D printing, stamping, forming, thermoforming, etc., and is then fastened to the first frontal face of the cellular structure by a method chosen from adhesive bonding, welding, brazing, etc.

When the invention is used to manufacture aircraft nacelle air intake panels, a step of shaping the panels is provided in order to give the panels curves both in a longitudinal direction X of the air intake and in a transverse direction Y of the air intake.

Various solutions may be envisaged. According to a first possibility, the capsular skin is shaped before it is joined to the cellular structure. This shaping of the cellular structure can be achieved when it is manufactured. This is the case, for example, if use is made of a method that results in a rigid skin being obtained: stamping, 3D printing or molding under certain conditions. If the capsular skin is obtained by molding, use is made of a mold, the plate of which has the desired panel shape, and of a polymerizable material that becomes sufficiently rigid after polymerization in order to maintain its shape in spite of manipulations and stresses to which the skin will be subjected in order to be joined to the cellular structure. The polymerization thus gives the capsular skin the desired panel shape; the cellular structure is then joined to the capsular skin and deformed in the process so as to closely follow the capsular skin and thereby take on the desired panel shape.

According to a second solution, the capsular skin and the cellular structure are shaped after they have been joined together. In other words, the capsular skin and the cellular structure are manufactured in a flat state, the cellular structure and the capsular skin are joined together in the flat state, and the secured assembly obtained is then shaped. In this case, it is easier to manufacture the capsular skin by molding, to join the cellular structure and the mold provided with fresh polymerizable material and then to carry out in situ polymerization of the capsular skin. To this end, use is made of a mold having a flat plate and of a polymerizable material which, after polymerization, retains sufficient flexibility to allow deformation of the assembly made up of the cellular structure and the (polymerized) capsular skin, this assembly then being shaped so as to give the panel a desired shape. This variant is easier to implement industrially.

It should be noted that it is possible to use a mold, the frontal dimensions of which correspond to the frontal dimensions of the cellular structure and of the panel to be manufactured. The capsular skin formed by the mold then extends over the entire cellular structure, next to all the cells thereof.

In a variant, it is possible to use a plurality of molds of smaller size, referred to as patches below, which are placed side by side, each patch corresponding to a zone of the cellular structure comprising a plurality of cells, this zone being delimited by walls of the cellular structure (the edges of the patch therefore facing walls of the structure and not crossing a cell). Each patch thus makes it possible to obtain a portion of capsular skin in one piece comprising a plurality of capsules and extending over a zone delimited by walls of the cellular structure. The junction between two patches is provided to ensure continuity between the two created skin portions. The edges of the patches are configured and the polymerization conditions are chosen such that the edges of two adjacent skin portions melt into one another so as to form a capsular skin that is continuous over the entire surface of the cellular structure and of the final panel.

As defined above, at least one channel is provided in the vicinity of the apex of each capsule of the capsular skin for the passage of acoustic waves. This channel can be created by piercing after formation (and stiffening) of the capsular skin, before or after the latter has been joined to the cellular structure.

In a variant, when the capsular skin is obtained by molding, use is made of a mold in which the raised elements each comprise, at their apex, a conical tip on which the polymerizable material is not deposited or held. Upon demolding, a hole (channel) will thus arise in the polymerized material at the apex of each capsule at the location of the tip. If necessary, if the tips of polymerized material appear at the apex of certain capsules, they are cut.

According to a second variant, the capsular skin incorporates a woven element in the upper part of each capsule and does not have polymerizable material at the apex of the capsules and in the vicinity of the apex; the channel or channels provided at the apex of each capsule are then formed by one or more meshes of the woven element. The woven elements are preferably made of wire cloth, for example made of titanium, stainless steel or the like. The woven elements may be parts of a woven layer that extends over the entire surface of the capsular skin or mutually independent elements, the capsular skin then not having cloth away from the upper parts of the capsules.

It may also be advantageous, depending on the intended acoustic specifications, to form a tube at the apex of each capsule (or in the vicinity of this apex). In this case, use is made of a mold, the raised elements of which each comprise, at their apex, a cylindrical peg (corresponding to the tube to be formed) extended by a conical tip (intended to form a hole at the end of the tube). The polymerizable material is deposited on the mold so as to cover the plate, the walls of the raised elements and the cylindrical pegs. If it also covers conical tips, the tips of polymerized material that are obtained will be cut.

The invention extends to an air intake and an aircraft nacelle that are equipped with acoustic panels according to the invention, and also to an aircraft propulsion unit and to an aircraft comprising at least one such propulsion unit.

BRIEF DESCRIPTION OF THE DRAWINGS

The invention, according to one exemplary embodiment, will be understood better and the advantages thereof will become more clearly apparent from reading the following detailed description, which is given by way of entirely non-limiting illustration, with reference to the appended drawings, in which.

DETAILED DESCRIPTION OF THE PREFERRED EMBODIMENTS

Figure 1:
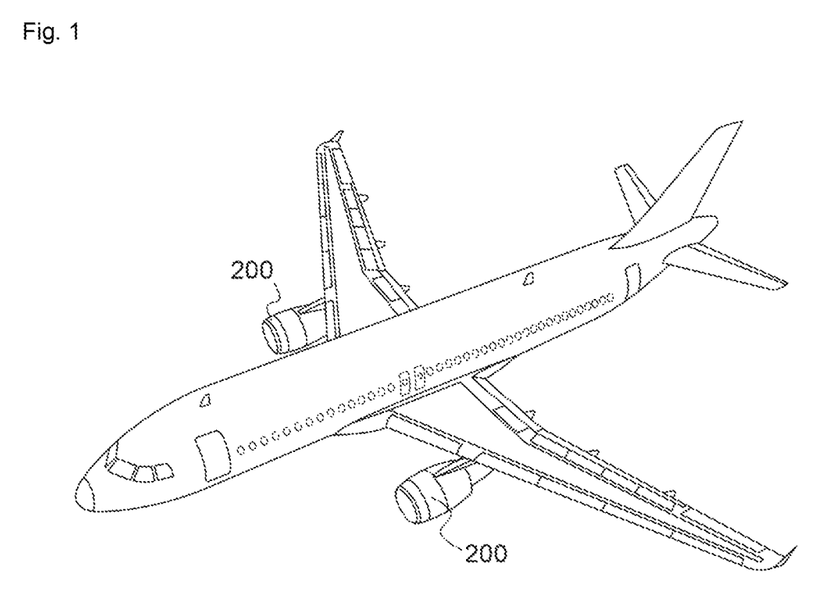
FIG. 1 is a perspective view of an aircraft of the prior art, but which can be equipped with acoustic panels according to the invention.

FIG. 1 shows a two-engine aircraft, the two nacelles 200 of which have an air intake that is able to be equipped with panels according to the invention.

Figure 2:
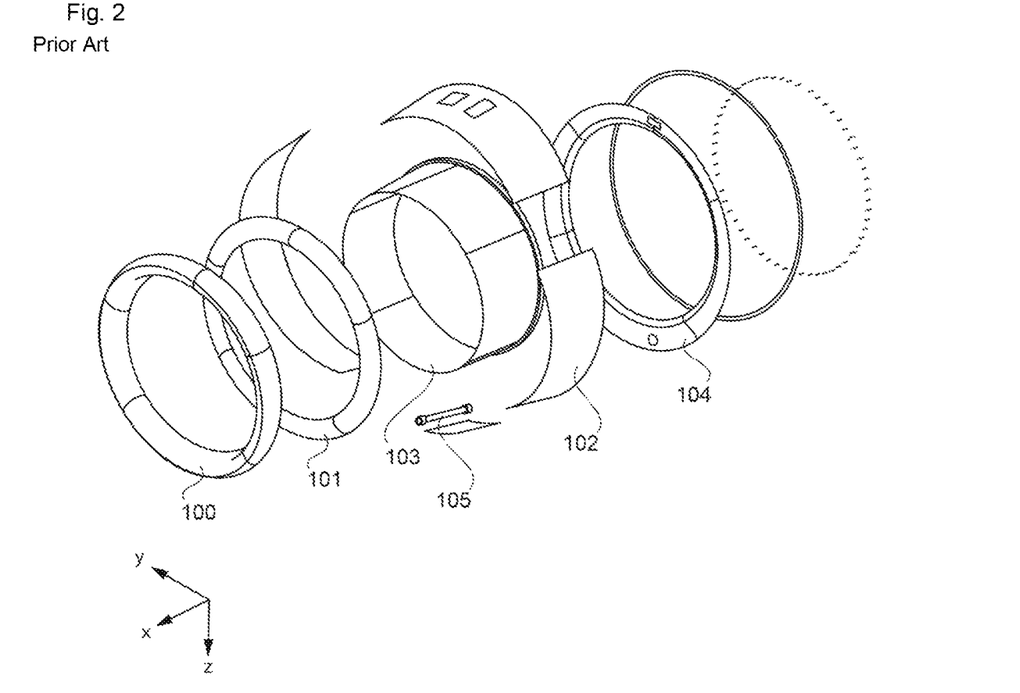
FIG. 2 is an exploded perspective view of an air intake of an aircraft nacelle of the prior art, but which can be equipped with acoustic panels according to the invention.

An aircraft nacelle air intake, such as the one illustrated in the appended FIG. 2, usually comprises structural elements such as a front frame 101 and a rear frame 104, and, from the front to the rear of the nacelle, a lip 100 carried by the front frame 101, external panels 102 that continue the lip on the outside of the nacelle, internal panels 103 that continue the lip on the inside of the nacelle and delimit an interior duct for channeling the air in the direction of the engine, the external panels 102 and internal panels 103 being supported by the front frame 101 and the rear frame 104.

Figure 3:
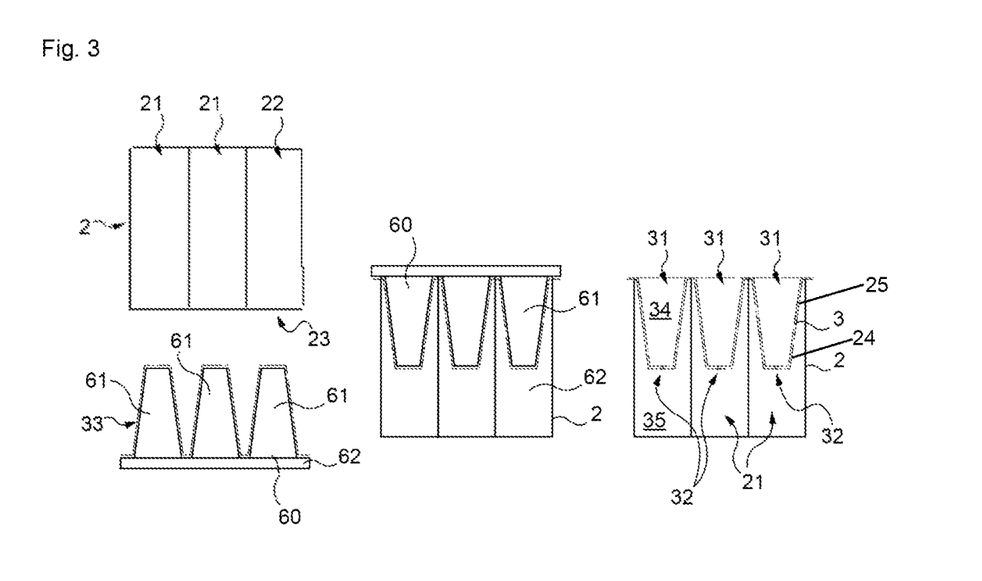
FIG. 3 is a view in cross section of a portion of a mold and of a cellular structure for manufacturing an acoustic panel according to the invention, at different stages of this manufacture.
Figure 4:
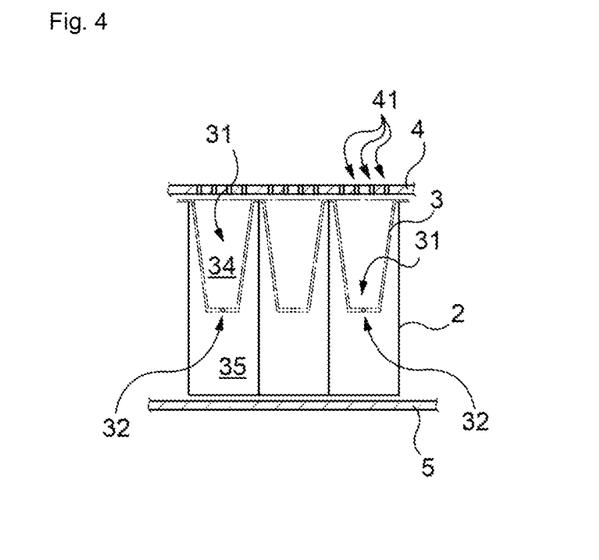
FIG. 4 is a view in cross section of a portion of an acoustic panel according to the invention.

The invention proposes novel acoustic panels that can be used as internal panels 103 in a conventional air intake such as the one illustrated in FIG. 2. The invention also proposes a simple industrial method for manufacturing these panels. FIGS. 3 and 4 illustrate the different steps in a preferred embodiment of this method.

The method according to the invention comprises the provision of a cellular structure 2 (see FIG. 3), which has cells 21 that extend transversely between a first frontal face 22 and a second frontal face 23. In the example illustrated, these cells open onto both the frontal faces of the structure. To produce the invention, it is sufficient, however, for the cells to open onto one of the frontal faces, known as the first frontal face.

Preferably, this cellular structure 2 is a honeycomb structure, made of synthetic fibers known under the trade name Nomex®. This material, which is well known to a person skilled in the art, is easily deformable (compressible, extensible and able to be curved) in a direction W; it is more rigid in a direction Y (orthogonal to W) while remaining able to be curved in this direction.

According to a preferred embodiment of the invention, use is also made of a mold 60 comprising a plate 62 which, in this case, is flat, and a plurality of raised elements 61 protruding from this plate.

A layer of polymerizable material 33 is deposited on the mold 60, this material being able to be a thermoplastic or an elastomer, in particular, a polyurethane.

While the polymerizable material is still fresh, the mold is turned over and pressed against the first frontal face 22 of the cellular (honeycomb) structure 2, each raised element 61 of the mold being inserted into a cell 21 of the structure.

The whole is cured at a "low" temperature, the curing temperature needing to allow the polymerization of the layer of polymerizable material 33 without deforming or damaging the cellular structure.

The mold is then removed, the layer of polymerized polymerizable material 33 forming a capsular skin 3 that adheres to the first frontal face 22 of the cellular structure and forms capsules 31 in the cells 21 of the cellular structure. The capsular skin 3 can be seen in the right-hand part of FIG. 3. Each capsule 31 thus divides a cell 21 into two acoustic pockets 34, 35 intended to damp waves of different frequencies, one of the acoustic pockets forming a ¼ wave resonator while the other acoustic pocket forms a Helmholtz resonator.

Holes are then pierced at the apex of the capsules 31 by any appropriate means in order to create channels 32 for the passage of acoustic waves between the two acoustic pockets of the cells.

Throughout the description, an "apex of a capsule" is understood as being the point of the capsule that is furthest away from the first frontal face of the cellular structure. If the end of the capsule that extends inside the cell is a flat face parallel to the first frontal face of the cellular structure as illustrated in the appended figures, the "apex" corresponds to the central point of this flat face and the channel can be provided at any location in this flat face, preferably at the middle (that is to say, exactly at the apex) but not necessarily (i.e., in the vicinity of the apex). If the end of the capsule that is situated inside the cell is not a flat surface but, for example, a spherical cap, the apex is the central peak of this cap, and the channel can be provided at this peak (that is to say, exactly at the apex) or in the vicinity of the apex, for example at any point on the spherical cap forming the end of the capsule.

In a preferred (but optional) version, in order to terminate the acoustic panel according to the invention, a resistive skin 4, which is perforated or micro-perforated with sound-absorption holes 41, and an intact structural skin 5 are fastened, by adhesive bonding or by ultrasonic welding, to an assembly made up of the cellular structure and the capsular skin 3.

As shown in FIG. 3, the capsular skin 3 incorporates a woven element 24 in the upper part of each capsule 31 and does not have polymerizable material at the apex of the capsules and in the vicinity of the apex; the channel 32 or channels provided at the apex of each capsule are then formed by one or more meshes of the woven element. The woven elements 24 are preferably made of wire cloth, for example made of titanium, stainless steel or the like. The woven elements 24 may be parts of a woven layer 25 that extends over the entire surface of the capsular skin 3 or mutually independent elements, the capsular skin then not having cloth away from the upper parts of the capsules 31.

In the example illustrated in FIG. 4, the resistive skin 4 is positioned at the first face 22 of the cellular structure, against the capsular skin 3, while the structural skin 5 is positioned against the second frontal face 23 of the cellular structure. The opposite is also possible. It should be noted that, for the sake of clarity, a small space has been left in the drawing between the skins 3 and 4; this space no longer exists once the skin 4 has been fastened to the skin 3. In the same way, the skin 5 appears to be detached from the cellular structure 2 in the drawing, this not being the case in the finished panel.

The distances between the apex of a capsule and the frontal faces of the cellular structure depend on the acoustic frequencies intended to be damped, the objective being to cover a range of low frequencies and a range of high frequencies by combining a ¼ wave resonator (the pocket of which has a height of several tens of mm) and a Helmholtz resonator (volume in mm3).

Depending on its destination, the panel needs to have one or more curves in one or more directions. In the case of an air intake internal panel (such as the panels 103 in FIG. 2), the desired shape for the panel is curved in the axial direction X of the air intake (meaning that a cross section of the panel through a plane comprising the central axis X of the air intake is a curved line); the panel is also curved in the transverse direction Y of the air intake or in the direction Z of gravity (in this case, a cross section of the panel through any plane YZ orthogonal to the central axis X of the air intake is preferably a circular arc). The panel therefore needs to be shaped.

Preferably, forming for obtaining the curve(s) of the panel takes place in the final part of the method for the manufacture thereof, after the production and assembly of the capsular skin 3 and the cellular structure 2. In this case, as illustrated in FIG. 3, use is made of a mold 60 (or the mold 70 or 80 in FIGS. 5 and 6), the plate 62 (or 72 or 82) of which is flat, and the assembly made up of the cellular structure 2 and the capsular skin 3 is flat. The forming can then be carried out, before or after the resistive skin 4 and structural skin 5 have been fastened. This forming is easier if the capsular skin 3 has been polymerized in situ as explained above, with a polymer material that maintains relative flexibility after polymerization.

In a variant, the resistive skin 4 and structural skin 5, for the one part, and the assembly made up of the cellular structure 2 and the capsular skin 3, for the other part, are formed before the skins are fastened to the assembly. In this case, the cellular structure and the capsular skin themselves can even be individually formed before being assembled. Such a method requires a high degree of precision, however, and appears to be more complex to implement.

Figure 5:
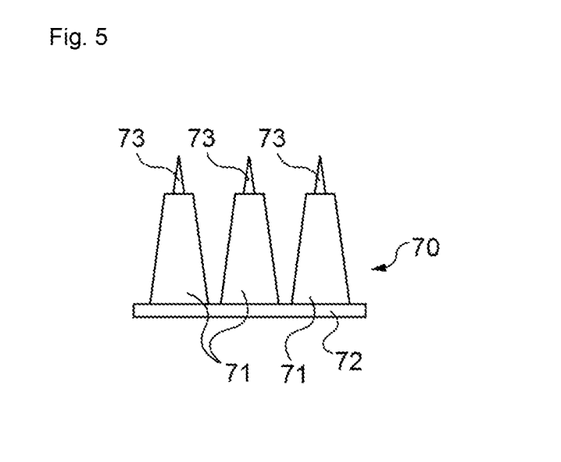
FIG. 5 is a view in cross section of a portion of a mold for manufacturing a capsular skin according to the invention.
Figure 6:
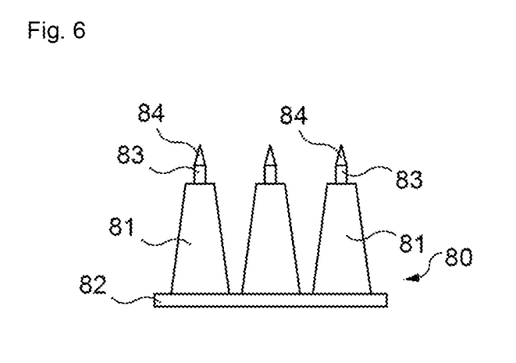
FIG. 6 is a view in cross section of a portion of another mold for manufacturing a capsular skin according to the invention.

FIG. 5 shows a mold 70 having a flat plate 72 and in which the raised elements 71 forming the capsules are surmounted by a conical tip 73 on which the polymerizable material is not deposited or held. After demolding, each conical tip 73 leaves a hole in the capsular skin at the apex of each capsule, for the passage of acoustic waves between the two acoustic pockets of the cell 21. The mold 80 in FIG. 6 comprises, at the apex of each of these raised elements, not just a conical tip 84, the function of which is the same as the tip 73 of the mold in FIG. 5, but also a cylindrical peg of circular section 83 on which polymerizable material is deposited and which makes it possible to obtain, after polymerization, at the apex of each capsule, a communication tube between the two acoustic pockets 34, 35, the tube forming a Helmholtz resonator with the pocket 35.

The invention extends to all the variants within the competence of a person skilled in the art that are covered by the scope of the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acoustic panel comprising: a cellular structure having a first frontal face and a second frontal face, between which there extend cells, said cells opening at least onto the first frontal face of the structure, a capsular skin fastened to the first frontal face of the cellular structure next to a plurality of cells of said cellular structure, said capsular skin comprising a continuous layer of material, in one piece, forming capsules that extend into the cellular structure, wherein the continuous layer of material comprises mutually independent wire cloth elements in an upper part of each capsule and does not have polymerizable material at the apex of the capsules, wherein the capsular skin incorporates a channel in a vicinity of the apex of each capsule formed by one or more meshes of the wire cloth elements, the capsular skin not having wire cloth away from the upper parts of the capsules, and a resistive skin fastened to the capsular skin, the capsular skin being obtained by molding the layer of material which includes a polymerizable material away from the apex in a mold comprising a plate and a plurality of raised elements connected to and protruding from the plate, each of the raised elements having a shape of the capsules, and the mold being provided with the layer of material arranged on the first frontal face of the cellular structure before the material is polymerized, the polymerization taking place in situ, wherein the capsular skin adheres directly to the first frontal face of the cellular structure.

2. The acoustic panel according to claim 1, wherein the at least one channel is a communication tube at the apex of each capsule.

3. A method for manufacturing an acoustic panel, comprising: providing a cellular structure having a first frontal face and a second frontal face, between which there extend cells, said cells opening at least onto the first frontal face of the structure, fastening a capsular skin to the first frontal face of the cellular structure next to a plurality of cells of said cellular structure, said capsular skin comprising a continuous layer of material, in one piece, forming capsules that extend into the cellular structure, providing at least one channel in a vicinity of an apex of each capsule for passage of acoustic waves, wherein the continuous layer of material comprises mutually independent wire cloth elements in an upper part of each capsule and does not have polymerizable material at the apex of the capsules formed by one or more meshes of the wire cloth element, the capsular skin not having wire cloth away from the upper parts of the capsules, obtaining the capsular skin, after forming the capsules, by molding the layer of material which includes a polymerizable material away from the apex in a mold comprising a plate having a plurality of raised elements connected to and protruding from the plate, each of the raised elements having a shape of the capsules, the polymerizable material being deposited on the mold, and arranging the mold on the first frontal face of the cellular structure, inserting each raised element into a cell of the cellular structure before the polarizable material of the layer of material is polymerized, and polymerizing the material in situ.

4. The method according to claim 3, including a step of withdrawing the mold after the material is polymerized, the layer of polymerized polymerizable material forming a capsular skin that adheres to the first frontal face of the cellular structure and forms capsules in the cells.

5. The method according to claim 3, further including a step of manufacturing the cellular structure in a flat state, and
   using a mold having a flat plate for the capsular skin,
   using a polymerizable material that maintains, after polymerization, sufficient flexibility to allow an assembly made up of the cellular structure and the capsular skin to deform, and
   shaping the assembly so as to give the panel a desired shape.

6. The method according to claim 3, wherein the polymerizable material is chosen from thermoplastic materials, elastomers, polyurethanes and epoxy resins.

7. The method according to claim 3, wherein the step of polymerizing comprises a step of heating at a temperature that is sufficiently low for the cellular structure not to be damaged.

8. An aircraft nacelle comprising acoustic panels according to claim 1.

9. An aircraft propulsion unit, comprising a nacelle according to claim 8.

10. An aircraft comprising at least one propulsion unit according to claim 9.

11. The method according to claim 3, wherein the resistive skin includes sound-absorbing holes in the form of micro-perforations.

12. The acoustic panel according to claim 1, wherein the resistive skin includes sound-absorbing holes in the form of micro-perforations.

* * * * *